(12) United States Patent
Sodagar (10) Patent No.: US 11,356,715 B2
(45) Date of Patent: Jun. 7, 2022

(54) DYNAMIC SHORTENING OF ADVERTISEMENT DURATION DURING LIVE STREAMING

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/718,499

(22) Filed: Dec. 18, 2019

(65) Prior Publication Data

US 2020/0213645 A1 Jul. 2, 2020

Related U.S. Application Data

(60) Provisional application No. 62/786,297, filed on Dec. 28, 2018.

(51) Int. Cl.
| | |
|---|---|
| *H04N 21/81* | (2011.01) |
| *H04N 21/234* | (2011.01) |
| *H04N 21/84* | (2011.01) |
| *H04N 21/854* | (2011.01) |
| *H04N 21/44* | (2011.01) |
| *H04N 21/2187* | (2011.01) |
| *H04N 21/235* | (2011.01) |

(Continued)

(52) U.S. Cl.
CPC ... *H04N 21/23424* (2013.01); *H04N 21/2187* (2013.01); *H04N 21/235* (2013.01); *H04N 21/44016* (2013.01); *H04N 21/643* (2013.01); *H04N 21/812* (2013.01); *H04N 21/84* (2013.01); *H04N 21/8456* (2013.01); *H04N 21/854* (2013.01)

(58) Field of Classification Search
None
See application file for complete search history.

(56) References Cited

U.S. PATENT DOCUMENTS

2008/0154708 A1 6/2008 Allan et al.
2012/0110620 A1 5/2012 Kilar et al.
(Continued)

OTHER PUBLICATIONS

International Search Report dated Mar. 12, 2020, issued by the International Searching Authority in application No. PCT/US2019/068534.
(Continued)

*Primary Examiner* — Gims S Philippe
*Assistant Examiner* — Charles N Hicks
(74) *Attorney, Agent, or Firm* — Sughrue Mion, PLLC (57) ABSTRACT

A method, apparatus, and computer-readable medium for shortening an advertisement duration using moving picture experts group (MPEG)-dynamic adaptive streaming over http (DASH), including transmitting, to a client, a media presentation description (MPD) including a remote period including the advertisement duration, and an indication that the advertisement duration is able to be shortened; receiving an update request including a shortened advertisement duration; updating the MPD based on the shortened advertisement duration to generate an updated MPD including the shortened advertisement duration; and transmitting the updated MPD to the client.

21 Claims, 5 Drawing Sheets

(51) Int. Cl.
*H04N 21/845* (2011.01)
*H04N 21/643* (2011.01)

(56) References Cited

U.S. PATENT DOCUMENTS

| | | | |
|---|---|---|---|
| 2013/0246643 A1* | 9/2013 | Luby | H04N 21/8455 |
| | | | 709/231 |
| 2014/0150019 A1* | 5/2014 | Ma | H04L 65/602 |
| | | | 725/34 |
| 2014/0195651 A1 | 7/2014 | Stockhammer et al. | |
| 2014/0281556 A1 | 9/2014 | Mao et al. | |
| 2015/0271237 A1 | 9/2015 | Stockhammer | |
| 2016/0182923 A1* | 6/2016 | Higgs | H04N 21/23424 |
| | | | 725/34 |
| 2016/0315956 A1* | 10/2016 | Giladi | H04N 21/6125 |
| 2017/0374121 A1 | 12/2017 | Phillips et al. | |
| 2018/0146230 A1* | 5/2018 | Zhang | H04N 21/23424 |

OTHER PUBLICATIONS

Written Opinion dated Mar. 12, 2020, issued by the International Searching Authority in application No. PCT/US2019/068534.
Eyevinn Technology, "Understanding Server-Side Dynamic Ad Insertion", In: Medium, Mar. 20, 2018, Retrieved on Feb. 23, 2020 from <https://medium.eom/@eyevinntechnology/understanding-server-side-dynamic-ad-insertion-d7ed90e34aa2>.

* cited by examiner

DYNAMIC SHORTENING OF ADVERTISEMENT DURATION DURING LIVE STREAMING

CROSS-REFERENCE TO RELATED APPLICATION

This application claims priority from U.S. Provisional Patent Application No. 62/786,297, filed on Dec. 28, 2018, in the U.S. Patent and Trademark Office, the disclosure of which is incorporated herein by reference in its entirety.

BACKGROUND

The Moving Picture Experts Group (MPEG)-Dynamic Adaptive Streaming Over HTTP (DASH) standard is becoming a key streaming technology for both live and video-on-demand use cases. The MPEG-DASH standard adopts a dynamic adaptive schema for two-dimensional (2D) media streaming.

In some existing MPEG-DASH implementations, advertisement breaks, i.e. the duration of ads, may be fixed by the origin server prior to the advertisement insertion, and the program goes back at to the main content at that known time. In such implementations, no changes of advertisement-duration can be performed by the advertisement-server.

SUMMARY

According to embodiments, a method of shortening an advertisement duration using moving picture experts group (MPEG)-dynamic adaptive streaming over http (DASH), is performed by at least one processor and includes transmitting, to a client, a media presentation description (MPD) including a remote period including the advertisement duration, and an indication that the advertisement duration is able to be shortened; receiving an update request including a shortened advertisement duration; updating the MPD based on the shortened advertisement duration to generate an updated MPD including the shortened advertisement duration; and transmitting the updated MPD to the client.

According to embodiments, an apparatus for shortening an advertisement duration using moving picture experts group (MPEG)-dynamic adaptive streaming over http (DASH) includes at least one memory configured to store program code; and at least one processor configured to read the program code and operate as instructed by the program code, the program code including: first transmitting code configured to cause the at least one processor to transmitting, to a client, a media presentation description (MPD) including a remote period including the advertisement duration, and an indication that the advertisement duration is able to be shortened; receiving code configured to cause the at least one processor to receive an update request including a shortened advertisement duration; updating code configured to cause the at least one processor to update the MPD based on the shortened advertisement duration to generate an updated MPD including the shortened advertisement duration; and second transmitting code configured to cause the at least one processor to transmit the updated MPD to the client.

According to embodiments, a non-transitory computer-readable medium stores instructions that, when executed by at least one processor of an apparatus for shortening an advertisement duration using moving picture experts group (MPEG)-dynamic adaptive streaming over http (DASH), cause the at least one processor to: transmit, to a client, a media presentation description (MPD) including a remote period including the advertisement duration, and an indication that the advertisement duration is able to be shortened; receive an update request including a shortened advertisement duration; update the MPD based on the shortened advertisement duration to generate an updated MPD including the shortened advertisement duration; and transmit the updated MPD to the client.

DETAILED DESCRIPTION

In embodiments, the advertisement duration of an advertisement can be shortened by an advertisement-server dynamically, and a new duration may be communicated to an origin sever for follow up manifest update. Embodiments may be used in live and on-demand streaming services with advertisement insertion, when the advertisements are dynamically inserted by a 3rd party in the defined instances, for example advertisement-breaks.

In embodiments, during a live streaming of content, there are certain moments that the advertisement can be inserted, which may be referred to as advertisement-breaks. The nominal duration of advertisements is decided by the content server and is inserted in a manifest. During that period, the client goes to advertisement-server and streams and/or plays back the advertisement. The advertisement-server may provide the advertisement content for that exact duration that is indicated in the original manifest. In real cases, sometimes the advertisement-server wants to serve advertisement or advertisements that their total duration is less than the designated duration by the content server. Embodiments enable the advertisement-server to do so, and in some embodiments to communicate with the content server the actual duration of the advertisements, thereby enabling the client to playback the content earlier than originally planned.

Embodiments make use of the communication between content server to client, client to advertisement-server and reverse to signal the new duration and update the manifest accordingly. Embodiments may use the open standard tools as well as a new Manifest event for MPD update. Optionally, the direct communication can occur between the advertisement-server and content server.

Figure 1:
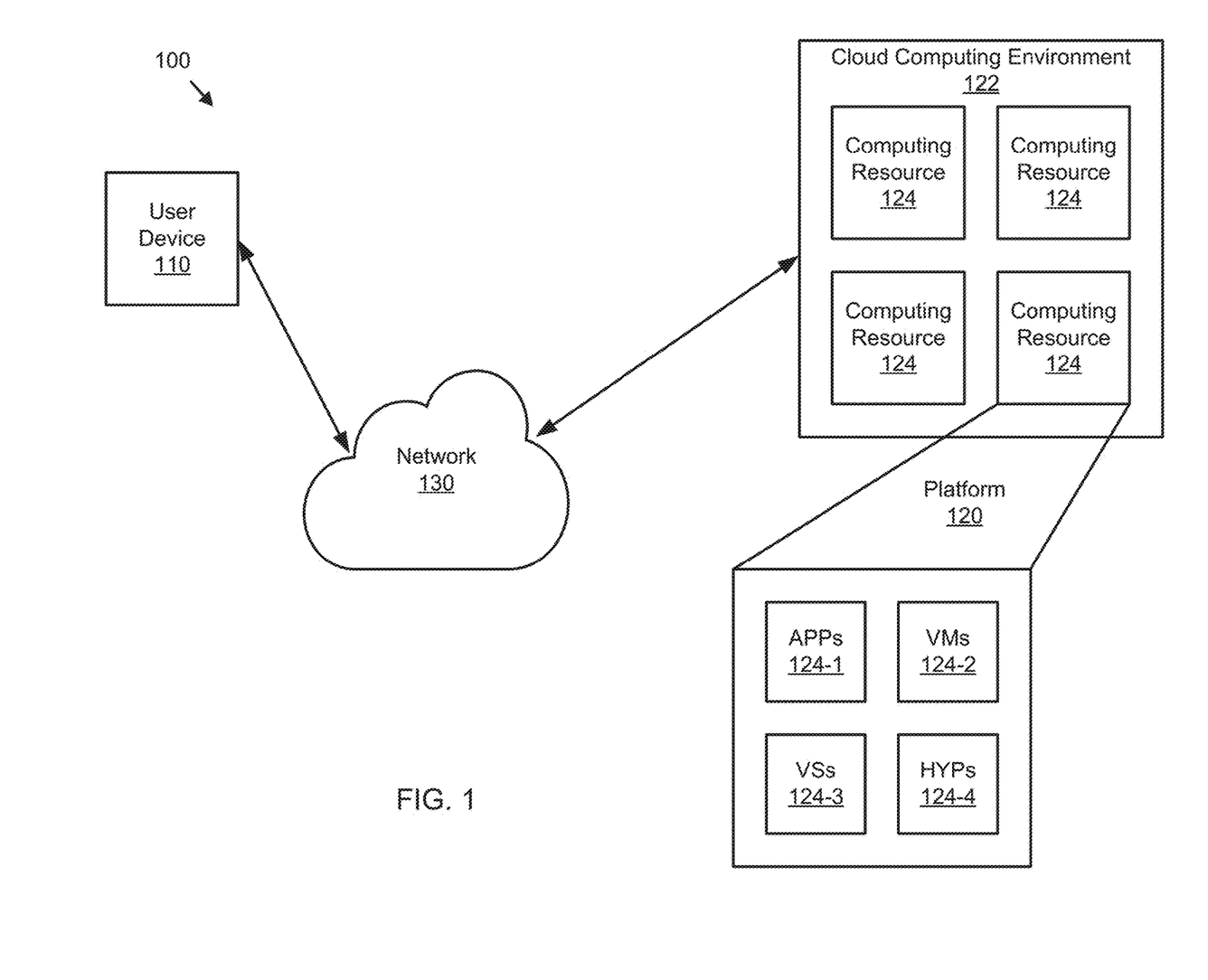
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
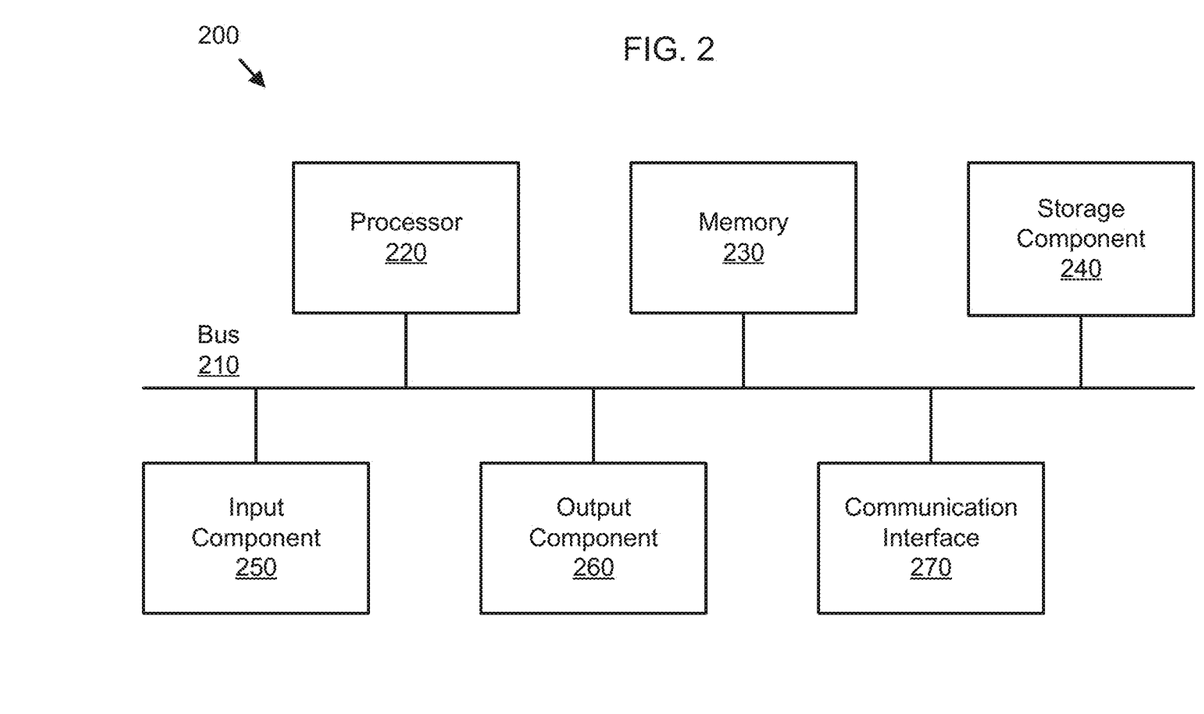
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
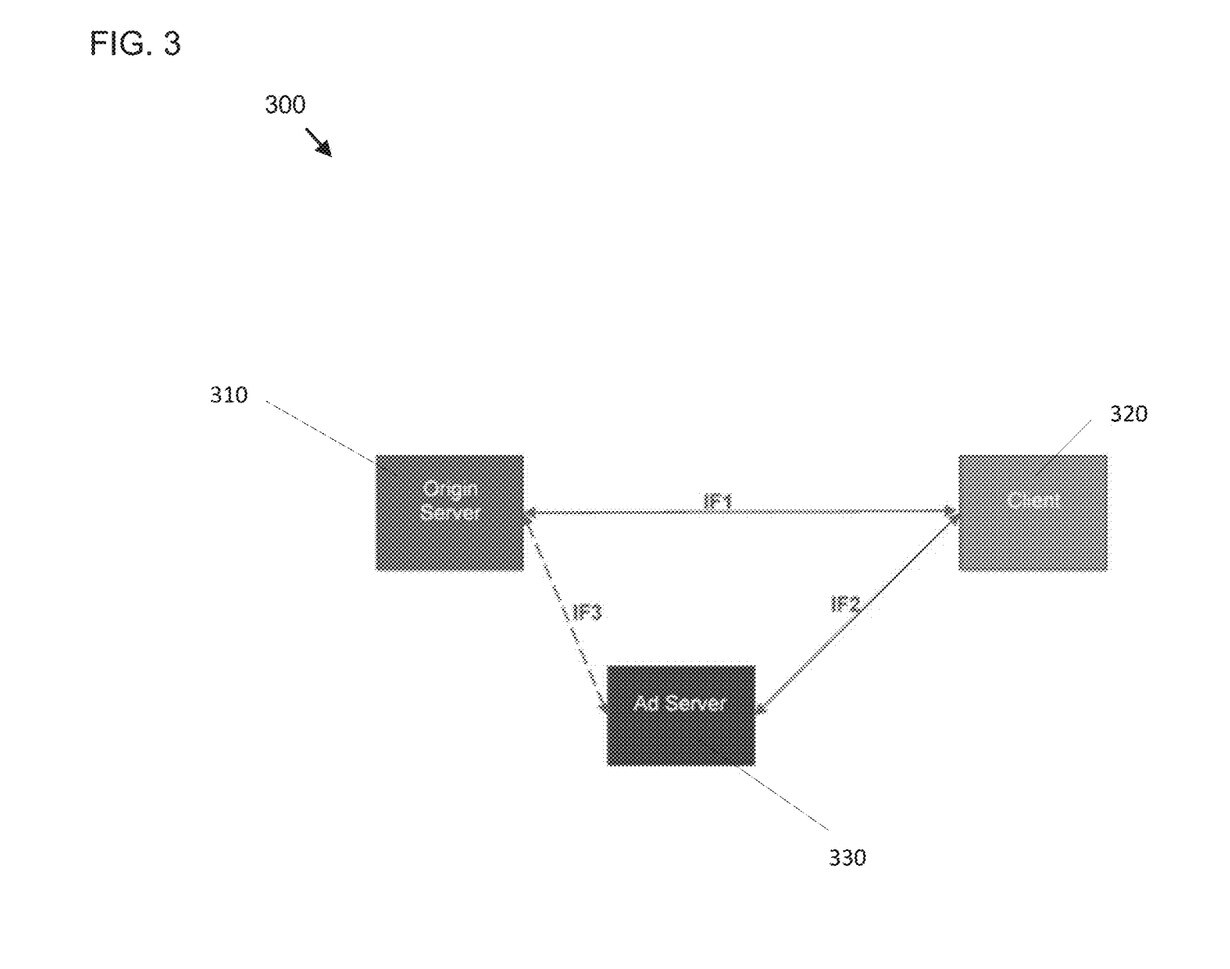
FIG. 3 is a block diagram of an MPEG-DASH streaming system, according to embodiments.

FIG. 3 illustrates an example of a general workflow of a streaming system 300 in which an origin server 310, a client 320, and an advertisement server 330 communicate with each other. The interfaces between origin server 310, client 320 and advertisement server 330 are shown by IF1, IF2 and IF3, respectively.

This disclosure includes examples of new workflows and signaling in IF1, IF2, and in some embodiments IF3 which may be beneficial in solving the problems discussed herein. The examples are referred to as Workflow 1, Workflow 2, Workflow 3, Workflow 4, and Workflow 5. These example workflows are provided for illustrative purposes, and the disclosure is not limited to the specifics of these example workflows. For example, in embodiments, these example workflows may be modified in any desired fashion by adding, removing, splitting, or combining elements or workflow steps.

Because the advertisement-break moment and its duration are signaled using remote periods in manifests, the duration of remote period may be predefined. Examples which allow shortening the duration of advertisement by advertisement-server is outlined in the following example workflows.
ft
Workflow 1:

In example Workflow 1, the remote period has a signal telling the advertisement-server 330 that it can shorten the duration of the advertisement (IF1). If the advertisement-server 330 decides to use a shorter advertisement, it communicates back to the client 320 by signaling the duration in the resolved period as well as requiring an MPD update event (IF2). The client 320 requests an update to manifest from origin server 310 while communicating back to the origin server 310 the new duration when it requests a manifest update (IF1). The origin server 310 provides the new update manifest with the updated duration suggested by the advertisement-server 330 to the client 320 (IF1). Shortening signal is removed in this version of the manifest. The client 320 resolves the manifest, now with correct duration, and plays back the ad-content and switches back to main content at the shortened duration (IF2).

Workflow 2:

In example Workflow 2, the remote period has a signal telling the advertisement-server 330 that it can shorten the duration of the advertisement (IF1). If the advertisement-server 330 decides to use a shorter advertisement, it communicates back to the client 320 by signaling the duration in the resolved period (IF2). The client 320 may be capable of content splicing, and may splice the advertisement to the original content at the end of advertisement period with the new duration. The client 320 maintains the duration of shorten advertisement for future manifest update corrections. Optionally at the next MPD update request, the client 320 communicates to the origin server 310 the shortened duration, and the server 310 optionally updates the manifest with the actual duration (IF1). The client 320 after each MPD update, corrects the duration to the actual duration, if it was not already corrected by the origin server 310.

Workflow 3:

In example Workflow 3, the remote period has a signal telling the advertisement-server 330 that it can shorten the duration of the advertisement (IF1). If the advertisement-server 330 decides to use a shorter advertisement, it requests the MPD from the origin server 310 and provides the shorten duration to it (IF3). The advertisement-server 330 creates two periods, one containing the advertisement, and one the continuation of the origin program, spliced at the actual duration, and provide the result to the client 320 (IF2). The origin server 310 optionally corrects the original manifest with the shorten duration for future MPD updates (IF1).

Workflow 4:

In example Workflow 4, the remote period has a signal telling the advertisement-server 330 that it can shorten the duration of the advertisement (IF1). If the advertisement-server 330 decides to use a shorter advertisement, it requests the MPD from the origin server 310 and provide the shorten duration to it (IF3). The origin server 310 updates the manifest with shorten advertisement period duration and splicing to a new period that has content. It provides the manifest to the advertisement-server 330. The advertisement-server 330 provide the xlink resolution using the received MPD from content server to the client 320 (IF2). The origin server 310 maintains the updated manifest for future MPD updates (IF1).

Workflow 5:

In example Workflow 5, The remote period has a signal telling the advertisement-server 330 that it can shorten the duration of the advertisement (IF1). If the advertisement-server 330 decides to use a shorter advertisement, it requests the xlink resolution from the origin server 310 and provide the shorten duration to it (IF3). The origin server 310 updates the manifest with shorten advertisement period duration and splicing to a new period that has content. The origin server 310 provides the xlink resolution to the advertisement-server 330. The advertisement-server 330 resolves the first part of xlink of the xlink resolution of a content server and provides the results to the client 320 (IF2). The origin server 310 maintains the updated manifest for future MPD updates (IF1).

In embodiments consistent with Workflow 1, the splicing intelligence resides in the origin server 310, while client 320 and advertisement-server 320 may have no additional splicing capabilities. In Workflow 2, the client 320 may have splicing intelligence, and in Workflow 3, the advertisement-server 330 may have splicing intelligence. In Workflow 4, the origin server 310 does the splicing, but the advertisement-server 330 obtains the updates directly from the origin server 310. In Workflow 5, the process is similar to Workflow 4, but the origin server 310 resolves the xlink request from the advertisement-server 330, but the content server provides two periods. The first period is the xlink with correct resolution and the second period, is the period of content for the duration between early ad-termination point and original duration.

Examples of signaling tools used in the all or some of the above workflows are discussed below.

Allowing Cutting the Duration

In embodiments, origin server 310 adds a UrlQueryInfo element of DASH specification (ISO/IEC 23009-1) Annex I in the remote period, signaling the duration of this period can be shortened. A queryString such as cutDurationAllowed is used to signal such conditions. Additionally, an ExtUrlInfo element of Annex I is used to request the query info to be added to any xlink request. An example is illustrated below:

```
<Period xlink:href="remote.period" zlink:actuate="onLoad">
xmlns:xlink="http://www.w3.org/1999/xlink">
    <SupplementalProperty
shemeIdUri="urn:mpeg:dash:urlparam:2016"
xmlns:up="urn:mpeg:dash:schema:urlparam:2016">
        <up:UrlQueryInfo queryString="cutDurationAllowed"/>
        <up:ExtUrlInfo includeInRequests="2"/>
    </SupplamentalProperty>
...
...
...
</Period>
```

A client 320 receiving such manifest adds the cutDurationAllowed string to the query along with the xlink request to the advertisement-server 330. The advertisement-server 330 parsing this query knows it can shorten the ad-duration.

Manifest Update Event with New Duration

In embodiments, the advertisement-server 330 resolve the xlink with the advertisement period. The advertisement period may include:

1. The new shortened duration
2. An optional MPD event, including an MPD update event.
3. A UrlQueryInfo element, signaling addition of the duration value as part of query for MPD update request.

An example of such period is shown below:

```
<Period id="1" duration="PT20S"
xlmns="urn:mpeg:dash:schema:mpd:2011">
        <EventStream schemeIdUri="urn:mpeg:dash:mpdevent:2018"
value="1">
            <Event presentationTime="0" duration="10000" id="0">
        </EventStream>
        <SupplementalProperty
schemeIdUri="urn:mpeg:dash:urlparam:2016"
xmlns:up="urn:mpeg:dash:schema:urlparam:2016">
            <up:UrlQueryInfo queryString="newDuration=PT20S"/>
            <up:ExtUrlInfo includeInRequests="3"/>
        </SupplamentalProperty>
...
...
</Period>
```

In this example, the duration is 20 seconds. Therefore, the query string attribute includes newDuration=PT20S as its value. In each case, the exact duration is included in this value.

New Manifest Event for MPD Update

Embodiments may include a new DASH MPD event: MPD update. This event is similar to inband MPD validity expiration event, with the difference that it is included in manifest and not inband. It has a different URL of its scheme identification but its values are same as the values of MPD validity expiration events.

In this case of signaling, the @presentationTime are set to zero (default), so that the client immediately to request the MPD update.

Advertisement-Server Request to Origin Server

If the client 320 includes the MPD location as part of query of its xlink request, the advertisement-server 330 can request the MPD from origin server 310 and with its request, advertisement a query similar to newDuration=PTXXXXS which XXXX is a number indicating the actual duration of the advertisements. The MPD Location can be added as part of the query string outlined in section 4.3.1.

The origin server 310 consequently can correct the advertisement period duration in its MPD updates.

The origin server 310 also can provide the updated MPD with the correct advertisement period duration to the advertisement-server 330. Alternatively, the content server can provide xlink resolution to the advertisement-server 330.

Figure 4:
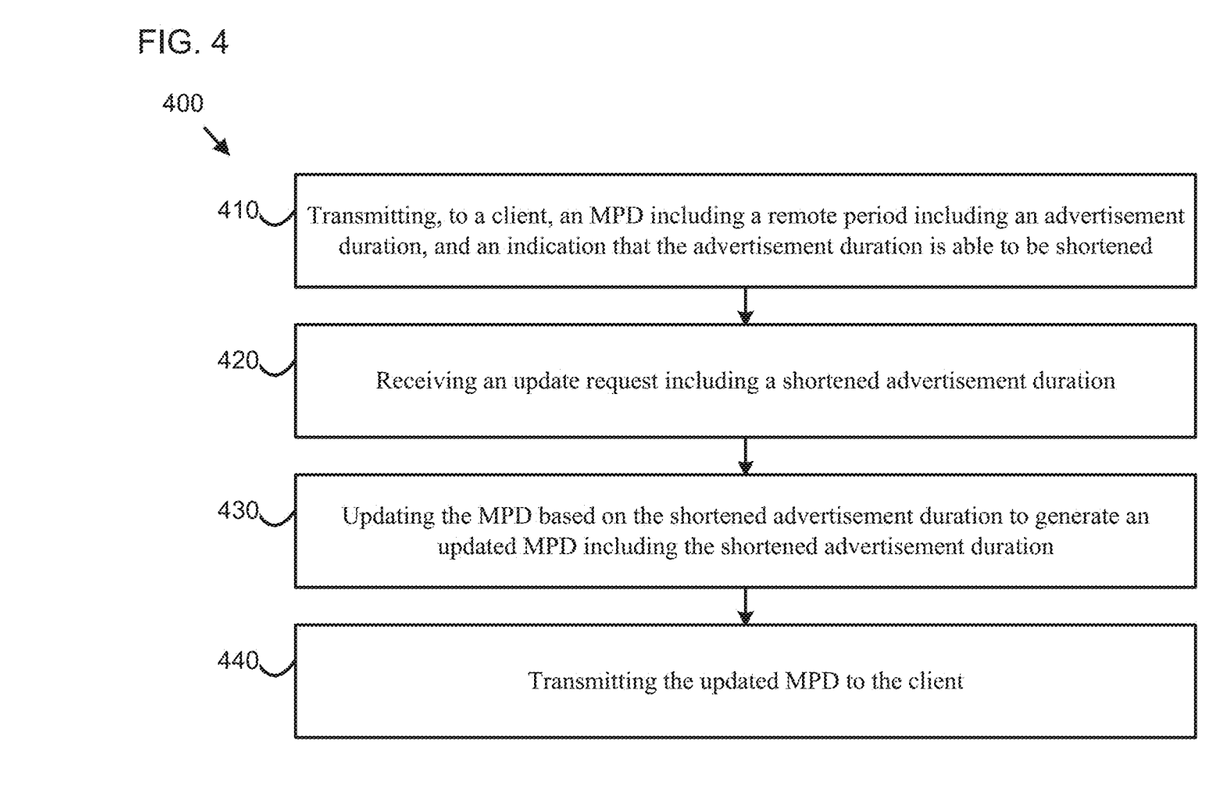
FIG. 4 is a flowchart of a method of shortening an advertisement duration, using MPEG-DASH, according to embodiments.

FIG. 4 is a flowchart of a method 400 of shortening an advertisement duration, using MPEG-DASH, according to embodiments. In some implementations, one or more process blocks of FIG. 4 may be performed by the platform 120 implementing the streaming system 300. In some implementations, one or more process blocks of FIG. 4 may be performed by another device or a group of devices separate from or including the platform 120 implementing the streaming system 300, such as the user device 110.

As shown in FIG. 4, in operation 410, the method 400 includes transmitting, to a client, a media presentation description (MPD) including a remote period including the advertisement duration, and an indication that the advertisement duration is able to be shortened.

In operation 420, the method 400 further includes receiving an update request including a shortened advertisement duration.

In operation 430, the method 400 further includes updating the MPD based on the shortened advertisement duration to generate an updated MPD including the shortened advertisement duration.

In operation 440, the method 400 further includes transmitting the updated MPD to the client.

The updated MPD may not include the indication that the advertisement duration is able to be shortened.

The generating of the updated MPD may further include splicing a new period including content into the MPD.

The update request may be received from the client.

The update request may be received from an advertisement server.

The update request may include a request to transmit the MPD to the advertisement server.

The update request may include a request for an xlink resolution.

The indication that the advertisement duration is able to be shortened may include a DASH element signaled in the remote period.

Although FIG. 4 shows example blocks of the method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel.

Figure 5:
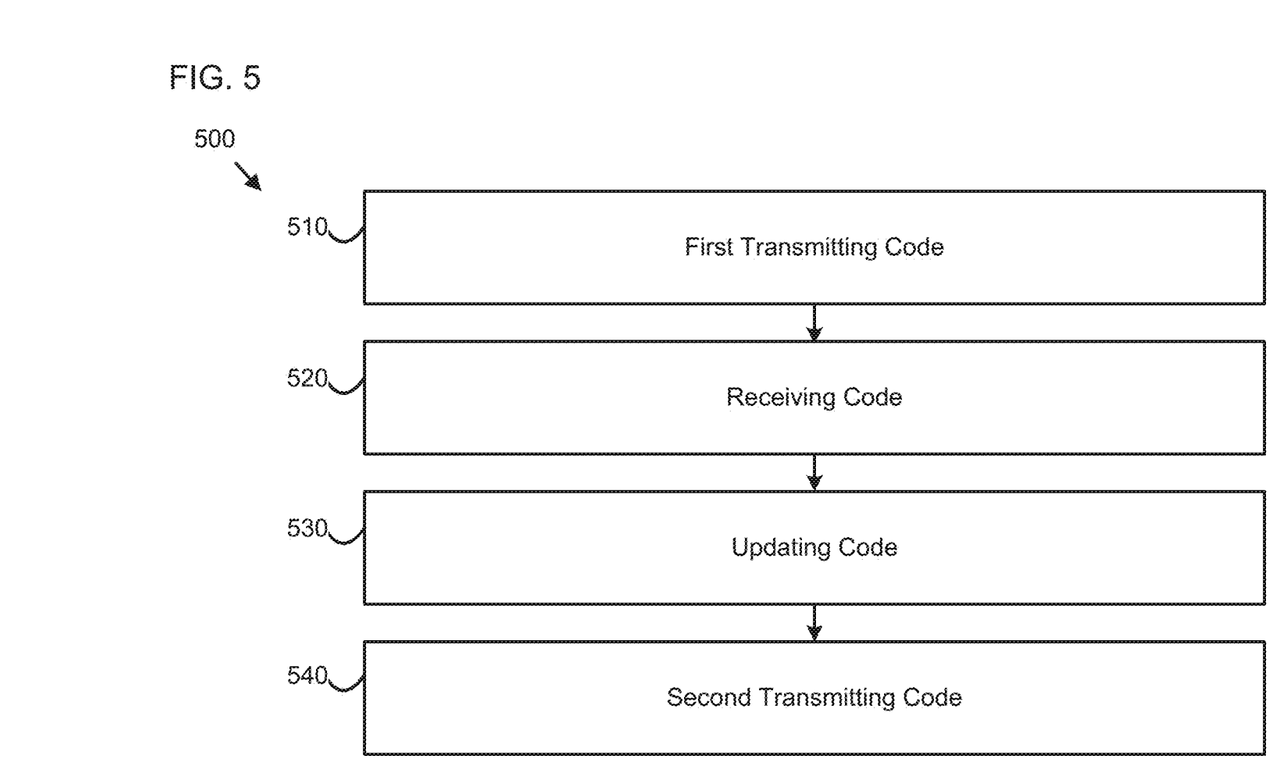
FIG. 5 is a block diagram of an apparatus for shortening an advertisement duration, using MPEG-DASH, according to embodiments.

FIG. 5 is a diagram of an apparatus 500 for shortening an advertisement duration, using MPEG-DASH, according to embodiments. As shown in FIG. 5, the apparatus 500 includes first transmitting code 510, receiving code 520, updating code 530 and second transmitting code 540.

The first transmitting code 510 may be configured to cause the at least one processor to transmitting, to a client, a media presentation description (MPD) including a remote period including the advertisement duration, and an indication that the advertisement duration is able to be shortened.

The receiving code 520 may be configured to cause the at least one processor to receive an update request including a shortened advertisement duration.

The updating code 530 may be configured to cause the at least one processor to update the MPD based on the shortened advertisement duration to generate an updated MPD including the shortened advertisement duration.

The second transmitting code 540 may be configured to cause the at least one processor to transmit the updated MPD to the client.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of shortening an advertisement duration using moving picture experts group (MPEG)-dynamic adaptive streaming over http (DASH), the method being performed by at least one processor, and the method comprising:

transmitting, to a client, a media presentation description (MPD) comprising a remote period including the advertisement duration, and a UrlQueryInfo element including a queryString which indicates that the advertisement duration is able to be shortened by explicitly stating that a cut to the advertisement duration is allowed;

receiving an update request including a shortened advertisement duration;

updating the MPD based on the shortened advertisement duration to generate an updated MPD including the shortened advertisement duration; and transmitting the updated MPD to the client.

2. The method of claim 1, wherein the updated MPD does not include the UrlQueryInfo element.

3. The method of claim 1, wherein the generating of the updated MPD further comprising splicing a new period including content into the MPD.

4. The method of claim 1, wherein the update request is received from the client.

5. The method of claim 1, wherein the update request is received from an advertisement server.

6. The method of claim 5, wherein the update request includes a request to transmit the MPD to the advertisement server.

7. The method of claim 5, wherein the update request includes a request for an xlink resolution.

8. The method of claim 1, wherein the UrlQueryInfo element including the queryString indicating that the advertisement duration is able to be shortened comprises a DASH element signaled in the remote period.

9. An apparatus for shortening an advertisement duration using moving picture experts group (MPEG)-dynamic adaptive streaming over http (DASH), the apparatus comprising:

at least one memory configured to store program code; and at least one processor configured to read the program code and operate as instructed by the program code, the program code comprising:

first transmitting code configured to cause the at least one processor to transmitting, to a client, a media presentation description (MPD) comprising a remote period including the advertisement duration, and a UrlQueryInfo element including a queryString which indicates that the advertisement duration is able to be shortened by explicitly stating that a cut to the advertisement duration is allowed;

receiving code configured to cause the at least one processor to receive an update request including a shortened advertisement duration;

updating code configured to cause the at least one processor to update the MPD based on the shortened advertisement duration to generate an updated MPD including the shortened advertisement duration; and second transmitting code configured to cause the at least one processor to transmit the updated MPD to the client.

10. The apparatus of claim 9, wherein the updated MPD does not include the UrlQueryInfo element.

11. The apparatus of claim 9, wherein the receiving code further comprises splicing code configured to cause the at least one processor to splice a new period including content into the MPD.

12. The apparatus of claim 9, wherein the update request is received from the client.

13. The apparatus of claim 9, wherein the update request is received from an advertisement server.

14. The apparatus of claim 9, wherein the UrlQueryInfo element including the queryString indicating that the advertisement duration is able to be shortened comprises a DASH element signaled in the remote period.

15. A non-transitory computer-readable medium storing instructions that, when executed by at least one processor of an apparatus for shortening an advertisement duration using moving picture experts group (MPEG)-dynamic adaptive streaming over http (DASH), cause the at least one processor to:

transmit, to a client, a media presentation description (MPD) comprising a remote period including the advertisement duration, and a UrlQueryInfo element including a queryString which indicates that the advertisement duration is able to be shortened by explicitly stating that a cut to the advertisement duration is allowed;

receive an update request including a shortened advertisement duration;

update the MPD based on the shortened advertisement duration to generate an updated MPD including the shortened advertisement duration; and transmit the updated MPD to the client.

16. The non-transitory computer-readable medium of claim 15, wherein the updated MPD does not include the UrlQueryInfo element.

17. The non-transitory computer-readable medium of claim 15, wherein the generating of the updated MPD further comprising splicing a new period including content into the MPD.

18. The non-transitory computer-readable medium of claim 15, wherein the update request is received from the client.

19. The non-transitory computer-readable medium of claim 15, wherein the update request is received from an advertisement server.

20. The non-transitory computer-readable medium of claim 15, wherein the UrlQueryInfo element including the queryString indicating that the advertisement duration is able to be shortened comprises a DASH element signaled in the remote period.

21. The method of claim 1, wherein the queryString comprises a cutDurationAllowed string.

* * * * *